US010466920B2

(12) United States Patent
Tzafrir et al.

(10) Patent No.: US 10,466,920 B2
(45) Date of Patent: Nov. 5, 2019

(54) METHOD FOR MAXIMIZING FREQUENCY WHILE CHECKING DATA INTEGRITY ON A PHYSICAL INTERFACE BUS

(71) Applicant: Western Digital Technologies, Inc., San Jose, CA (US)

(72) Inventors: Yonatan Tzafrir, Petah Tikva (IL); Mordekhay Zehavi, Raanana (IL); Mahmud Asfur, Bat-Yam (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/679,468

(22) Filed: Aug. 17, 2017

(65) Prior Publication Data

US 2019/0056880 A1   Feb. 21, 2019

(51) Int. Cl.
*G11C 8/00* (2006.01)
*G06F 3/06* (2006.01)
*G06K 7/00* (2006.01)

(52) U.S. Cl.
CPC ............ *G06F 3/0635* (2013.01); *G06F 3/064* (2013.01); *G06K 7/0008* (2013.01); *G06K 2207/1018* (2013.01)

(58) Field of Classification Search
CPC ...... G06F 3/0635; G06F 3/064; G11C 7/1006
See application file for complete search history.

(56) References Cited

U.S. PATENT DOCUMENTS

| 7,446,592 | B2 | 11/2008 | Tripathi et al. |
| 7,800,975 | B2 | 9/2010 | Rombach et al. |
| 8,411,517 | B2 | 4/2013 | Choi |
| 8,484,522 | B2 | 7/2013 | Flynn et al. |
| 8,520,455 | B2 | 8/2013 | Ross et al. |
| 2006/0031710 | A1 | 2/2006 | Jo |
| 2006/0140287 | A1* | 6/2006 | Alon ............... H04L 5/1423 375/260 |
| 2007/0018712 | A1 | 1/2007 | Gk et al. |
| 2007/0045789 | A1* | 3/2007 | Clavequin ............. G06F 1/10 257/666 |
| 2012/0159230 | A1* | 6/2012 | Chen .................... G06F 1/08 713/600 |
| 2014/0143593 | A1 | 5/2014 | Strauss et al. |

(Continued)

OTHER PUBLICATIONS

Micron; "3D NAND Flash Memory"; 2016; Micron Technologies Inc.; (2 pages) 2016.

(Continued)

*Primary Examiner* — Uyen B Tran
(74) *Attorney, Agent, or Firm* — Patterson & Sheridan, LLP; Steven H. Versteeg

(57) ABSTRACT

A data storage device includes a controller and a memory. The controller includes a host interface and a memory interface. The controller performs a first operation on the memory through the memory interface at a first frequency associated with the host interface to determine a first data pattern. The controller performs a read operation on the memory through the memory interface at a second frequency to determine a second data pattern. The controller changes the first frequency by a predetermined amount until the first frequency is equal to a maximum operating frequency having an associated risk of a setup/hold violation that is below a predetermined probability.

24 Claims, 5 Drawing Sheets

(56) References Cited

U.S. PATENT DOCUMENTS

| | | |
|---|---|---|
| 2015/0003156 A1 | 1/2015 | Berckmann et al. |
| 2015/0067419 A1 | 3/2015 | Raghu et al. |
| 2015/0187442 A1 | 7/2015 | Sivasankaran et al. |
| 2017/0031845 A1 | 2/2017 | Tzafrir |
| 2017/0053683 A1* | 2/2017 | Lee .......................... G11C 7/22 |
| 2018/0189211 A1* | 7/2018 | Zehavi ................ G06F 13/3625 |
| 2019/0058474 A1 | 2/2019 | Tzafrir et al. |

OTHER PUBLICATIONS

Tzafrir, Yonatan, "Interface Adjustment Processes for a Data Storage Device," U.S. Appl. No. 14/812,794, filed Jul. 29, 2015, (63 pages).

* cited by examiner

METHOD FOR MAXIMIZING FREQUENCY WHILE CHECKING DATA INTEGRITY ON A PHYSICAL INTERFACE BUS

BACKGROUND OF THE DISCLOSURE

Field of the Disclosure

This disclosure is generally related to data storage devices and more specifically to an interface bus between components of a data storage device.

Description of the Related Art

During operation of a data storage device, data may be communicated between a controller and a memory of the data storage device via a data bus that couples the controller and the memory. For example, one or more data values may be provided to or received from the data bus at a transfer rate based on a frequency of a clock signal. To illustrate, a first data value may be provided to the data bus from the controller in response to a rising edge of the clock signal. As another example, a second data value may be received from the data bus and stored at the controller in response to a falling edge of the clock signal.

A data storage device may be designed to have a fixed clock frequency that allows sufficient setup and hold times to enable reliable transmission and sampling of data over a bus interface between integrated circuits (e.g., a controller and a non-volatile memory). Typically, large margins are provided with respect to the clock frequency to account for worst-case scenarios (e.g., worst-case silicon process speed, system voltage, and system temperature (PVT) conditions) that may occur during operation of the data storage device. Setting the clock frequency (e.g., a data transfer rate) to the fixed value may avoid errors that may occur if the data transfer rate is too high in such worst-case scenarios. However, by operating the data storage device (e.g., the bus) at a clock frequency based on the worst-case scenarios, a data transfer rate (e.g., a bus speed) may be significantly lower than a theoretical maximum data transfer rate of the bus.

Therefore, there is a need in the art for a data storage device that has an adjustable clock frequency.

SUMMARY OF THE DISCLOSURE

The present disclosure generally relates to a data storage device that includes a controller and a memory. The controller includes a host interface and a memory interface. The controller performs a first operation on the memory through the memory interface at a first frequency associated with the host interface to determine a first data pattern. The controller performs a read operation on the memory through the memory interface at a second frequency to determine a second data pattern. The controller changes the first frequency by a predetermined amount until the first frequency is equal to a maximum operating frequency having an associated risk of a setup/hold violation that is below a predetermined probability.

In response to the first pattern being equal to the second pattern, the controller increases the first frequency by a predetermined amount. In response to the first pattern being not equal to the second pattern, the controller decreases the first frequency by the predetermined amount. The predetermined amount may be based on a setup and hold time required by the read operation. The predetermined amount may be based on at least one of a change in operating voltage, operating temperature, or load of the host interface.

In an embodiment, the controller terminates changing the first frequency when the first frequency is equal to a maximum operating frequency. The changing the first frequency may occur during an idle time of the host interface. The changing the first frequency may occur a predetermined amount of time after the completion of the controller servicing an interrupt. The second frequency is a relaxed frequency that is lower than a maximum operating frequency.

In an embodiment, the first operation is a write operation or a read operation.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
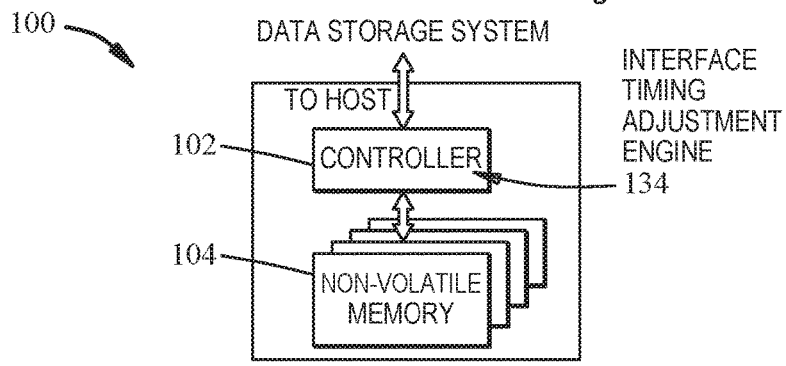
FIG. 1 is a block diagram of an illustrative example of a data storage system including a controller that includes an interface timing adjustment engine.

Particular aspects of the present disclosure are described below with reference to the drawings. In the description, common features are designated by common reference numbers. Although certain examples are described herein with reference to a data storage device, it should be appreciated that techniques described herein are applicable to other implementations. Further, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." Further, an operation performed "based on" a condition or event may also be performed based on one or more other conditions or events not explicitly recited. As used herein, "exemplary" may indicate an example, an implementation, and/or an aspect, and should not be construed as limiting or as indicating a preference or a preferred example, implementation, and/or aspect.

The present disclosure describes systems and methods of identifying a risk of a setup/hold violation associated with a data bus interface and adjusting a frequency of a clock signal, based on the identified risk. A data storage device includes a controller and a memory. The controller includes a host interface and a memory interface. The controller performs a first operation on the memory through the memory interface at a first frequency associated with the host interface to determine a first data pattern. The controller performs a read operation on the memory through the memory interface at a second frequency to determine a second data pattern. In response to the first pattern being equal to the second pattern, the controller increases the first frequency by a predetermined amount. In response to the first pattern being not equal to the second pattern, the controller decreases the first frequency by the predetermined amount. Performing the first operation, performing the read operation, and increasing or decreasing the first frequency are repeated until the first frequency is equal to a maximum operating frequency having an associated risk of a setup/ hold violation associated that is below a predetermined probability.

By varying the operating frequency by one or more predetermined amounts, a real-time (i.e., "on the fly") measure of a risk of setup and hold time violations are provided. The real-time measure may enable operation of the data bus interface (e.g., a bus) at a "maximal" reliable clock frequency. For example, the "on the fly" monitoring of bus operations may provide a real-time warning of nearing a condition of a setup time violation or a hold time violation. In response to identification of a risk of a setup/hold time violation, the operating frequency may be adjusted to avoid the setup/hold time violation. By adjusting the frequency of the clock signal, the data bus interface can reliably operate with a "maximal" frequency (without setup/hold violations) during different operating conditions that result from changing PVT conditions. Accordingly, the data bus interface may operate at rate that is higher than a rate appropriate for a worst-case scenario, thus improving an overall performance of the data bus interface.

Figure 2:
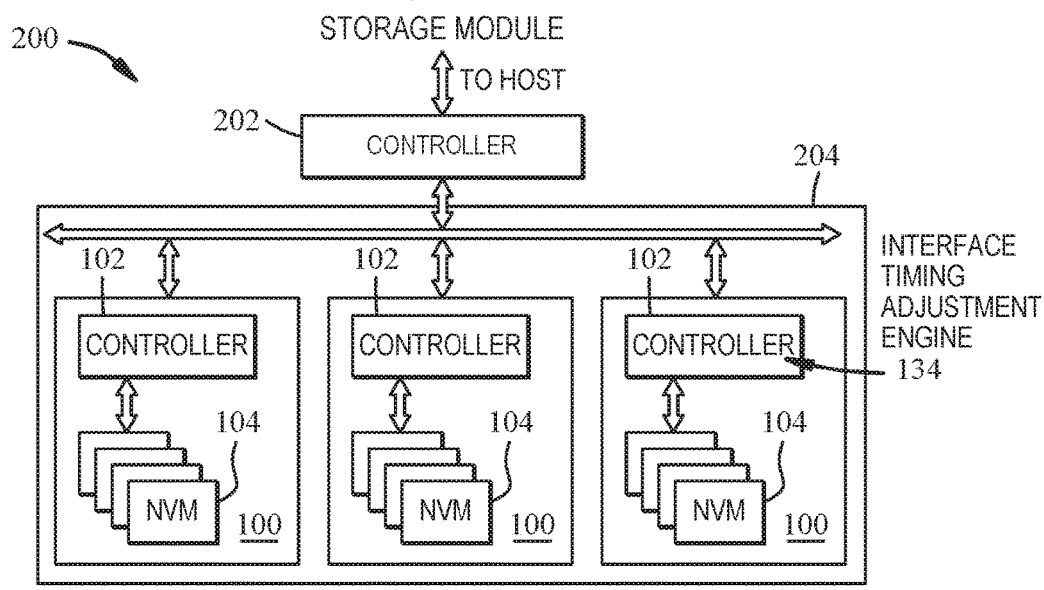
FIG. 2 is a block diagram of an illustrative example of a storage module that includes a plurality of data storage systems that each may include a controller having an interface timing adjustment engine.
Figure 3:
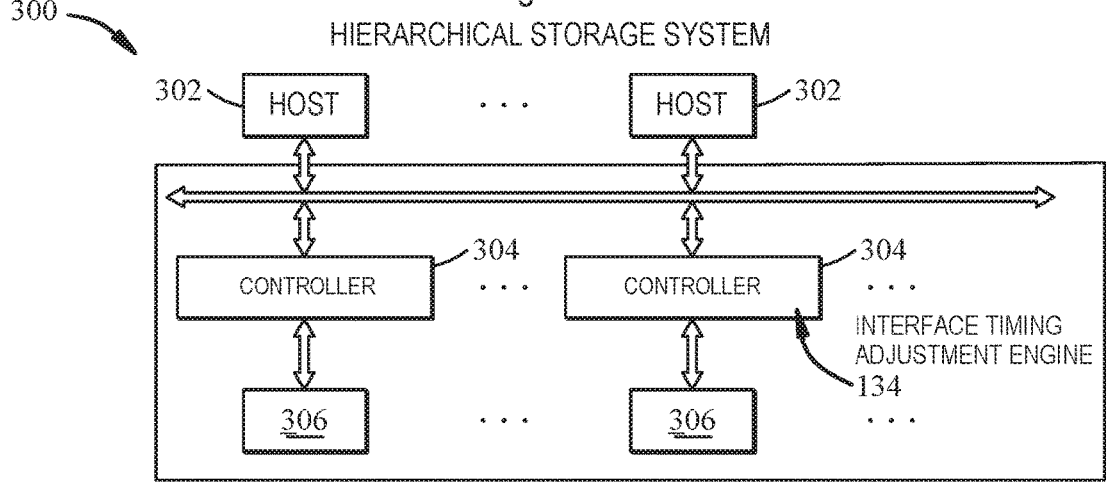
FIG. 3 is a block diagram of an illustrative example of a hierarchical data storage system that includes a plurality of controllers that each may include an interface timing adjustment engine.

Memory systems suitable for use in implementing aspects of the disclosure are shown in FIGS. 1-3. FIG. 1 is a block diagram illustrating a data storage system 100 according to an example of the subject matter described herein. Referring to FIG. 1, the data storage system 100 includes a controller 102 and non-volatile memory that may be made up of one or more non-volatile memory die 104. As used herein, the term "memory die" refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104. The controller 102 may include an interface timing adjustment engine 134.

The controller 102 (which may be a flash storage controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can be stored external to the controller, and other components can be used. Additionally, the phrase "operatively in communication with" could mean directly in communication with or indirectly (wired or wireless) in communication with through one or more components, which may or may not be shown or described herein.

As used herein, a flash storage controller is a device that manages data stored on flash memory and communicates with a host, such as a computer or electronic device. A flash storage controller can have various functionalities in addition to the specific functionality described herein. For example, the flash storage controller can format the flash memory, map out bad flash memory cells, and allocate spare cells to be substituted for future failed cells. Some part of the spare cells can be used to hold firmware to operate the flash storage controller and implement other features. In operation, when a host is to read data from or write data to the flash memory, the host communicates with the flash storage controller. If the host provides a logical address to which data is to be read/written, the flash storage controller can convert the logical address received from the host to a physical address in the flash memory. (Alternatively, the host can provide the physical address.) The flash storage controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, data storage system 100 may be a card based system, such as a secure digital (SD) or a micro secure digital (micro-SD) card. In an alternate embodiment, data storage system 100 may be part of an embedded memory system.

Although, in the example illustrated in FIG. 1, data storage system 100 includes a single channel between controller 102 and non-volatile memory die 104, the subject matter described herein is not limited to having a single memory channel. For example, in some NAND memory system architectures (such as the ones shown in FIGS. 2 and 3), 2, 4, 8 or more NAND channels may exist between the controller and the NAND memory device, depending on controller capabilities. In any of the embodiments described herein, more than a single channel may exist between the controller 102 and the non-volatile memory die 104, even if a single channel is shown in the drawings.

FIG. 2 illustrates a storage module 200 that includes a plurality of data storage systems 100. As such, storage module 200 may include a controller 202 that interfaces with a host and with storage system 204, which includes a plurality of data storage systems 100. The interface between controller 202 and data storage systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers. Each controller 102 of FIG. 2 may include an interface timing adjustment engine corresponding to the interface timing adjustment engine 134. Alternatively or in addition, the controller 202 may include an interface timing adjustment engine corresponding to the interface timing adjustment engine 134.

FIG. 3 is a block diagram illustrating a hierarchical storage system 300. A hierarchical storage system 300 includes a plurality of controllers 304, each of which controls a respective storage system 306. Controllers 304 may access memories within the hierarchical storage system 300 via a bus interface. In one embodiment, the bus interface may be an NVMe or fiber channel over Ethernet (FCoE) interface. In one embodiment, the hierarchical storage system 300 illustrated in FIG. 3 may be a rack mountable mass storage system that is accessible by multiple host computers 302, such as would be found in a data center or other location where mass storage is needed. Each controller 202 of FIG. 2 may include an interface timing adjustment engine corresponding to the interface timing adjustment engine 134.

Figure 4:
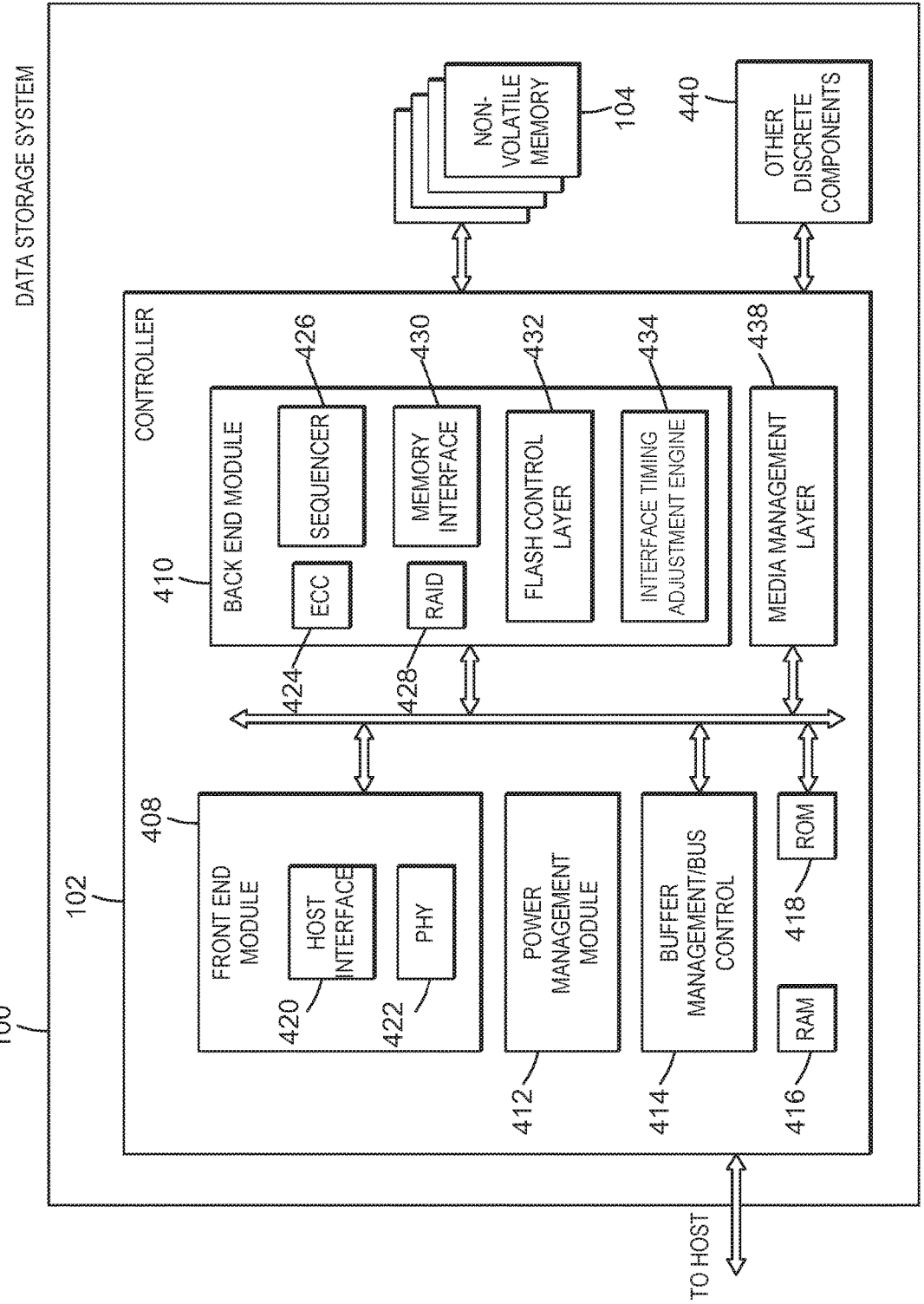
FIG. 4 is a block diagram illustrating an example of a data storage system including a controller that may include an interface timing adjustment engine.

FIG. 4 is a block diagram illustrating exemplary components of controller 102 in more detail. Controller 102 includes a front end module 408 that interfaces with a host, a back end module 410 that interfaces with the one or more non-volatile memory die 104, and various other modules that perform other functions. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller 414 manages buffers in random access memory (RAM) 416 and controls the internal bus arbitration of the controller 102. A read only memory (ROM) 418 stores system boot code. Although illustrated in FIG. 4 as located within the controller 102, in other embodiments one or both of the RAM 416 and the ROM 418 may be located externally to the controller 102. In yet other embodiments, portions of RAM and ROM may be located both within the controller 102 and outside the controller 102.

Front end module 408 includes a host interface 420 and a physical layer interface (PHY) 422 that provide the electrical interface with the host or next level controller. The choice of the type of host interface 420 can depend on the type of memory being used. Examples of host interfaces 420 include, but are not limited to, SATA, SATA Express, SAS, Fibre Channel, USB, PCIe, and NVMe. The host interface 120 typically facilitates transfer for data, control signals, and timing signals.

Back end module 410 includes an error correction code (ECC) engine 424 that encodes the data received from the host, and decodes and error corrects the data read from the non-volatile memory. A command sequencer 426 generates command sequences, such as program and erase command sequences, to be transmitted to non-volatile memory die 104. A RAID (Redundant Array of Independent Drives) module 428 manages generation of RAID parity and recovery of failed data. The RAID parity may be used as an additional level of integrity protection for the data being written into the non-volatile memory die 104. In some cases, the RAID module 428 may be a part of the ECC engine 424. A memory interface 430 provides the command sequences to non-volatile memory die 104 and receives status information from non-volatile memory die 104. For example, the memory interface 430 may be a double data rate (DDR) interface, such as a Toggle Mode 200, 400, or 800 interface. A flash control layer 432 controls the overall operation of back end module 410. The back end module 410 may also include the interface timing adjustment engine 434.

Additional components of data storage system 100 illustrated in FIG. 4 include a power management module 412 and a media management layer 438, which performs wear leveling of memory cells of non-volatile memory die 104. Data storage system 100 also includes other discrete components 440, such as external electrical interfaces, external RAM, resistors, capacitors, or other components that may interface with controller 102. In alternative embodiments, one or more of the physical layer interface 422, RAID module 128, media management layer 138 and buffer management/bus controller 114 are optional components that are omitted from the controller 102.

Figure 5:
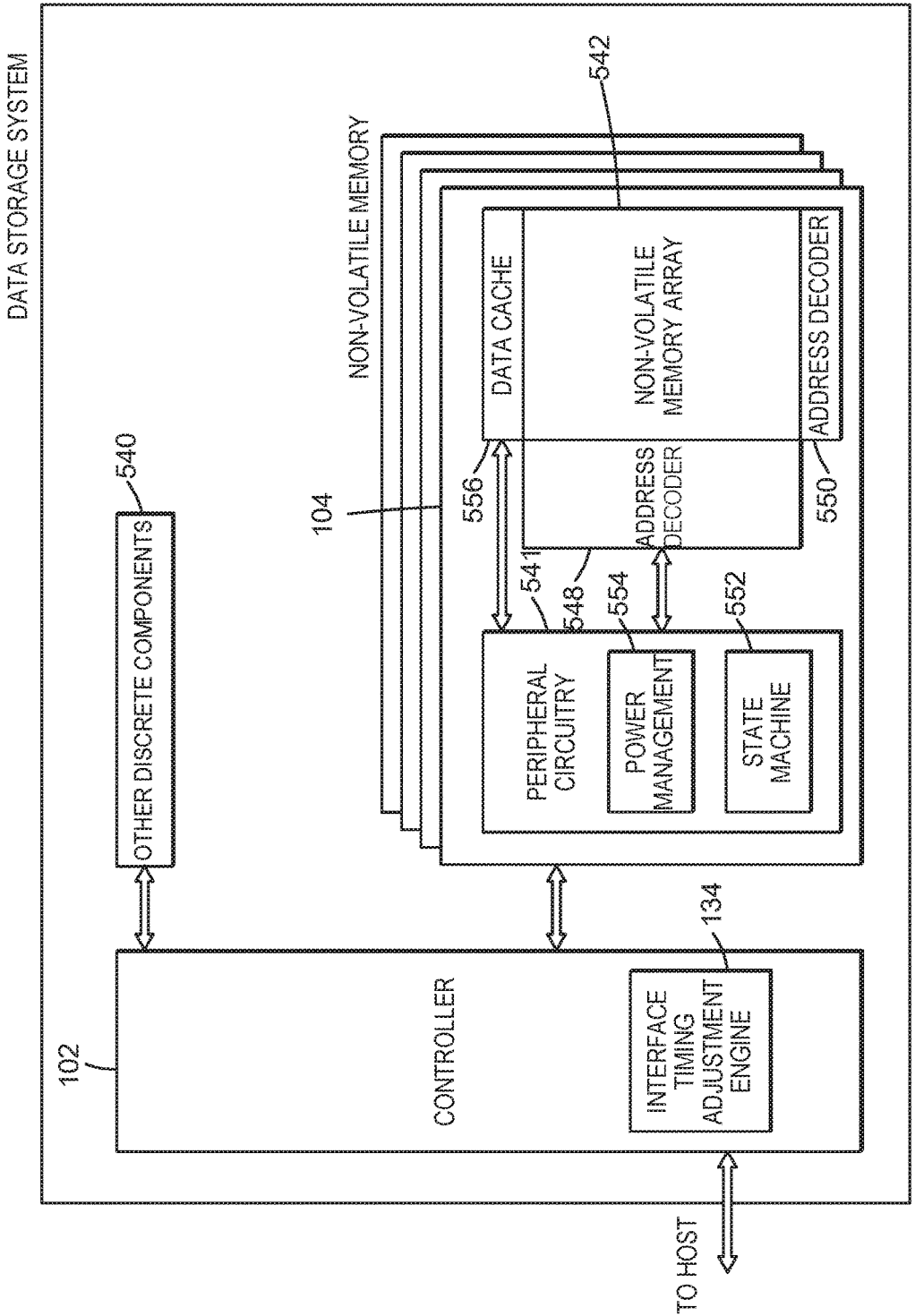
FIG. 5 is a block diagram illustrating exemplary components of a non-volatile memory die that may be coupled to a controller that includes an interface timing adjustment engine.

FIG. 5 is a block diagram illustrating exemplary components of non-volatile memory die 104 in more detail. Non-volatile memory die 104 includes peripheral circuitry 541 and non-volatile memory array 542. Non-volatile memory array 542 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 541 includes a state machine 552 that provides status information to controller 102, which may include the interface timing adjustment engine 134. The peripheral circuitry 541 may also include a power management or data latch control module 554. Non-volatile memory die 104 further includes discrete components 540, an address decoder 548, an address decoder 550, and a data cache 556 that caches data.

Figure 6:
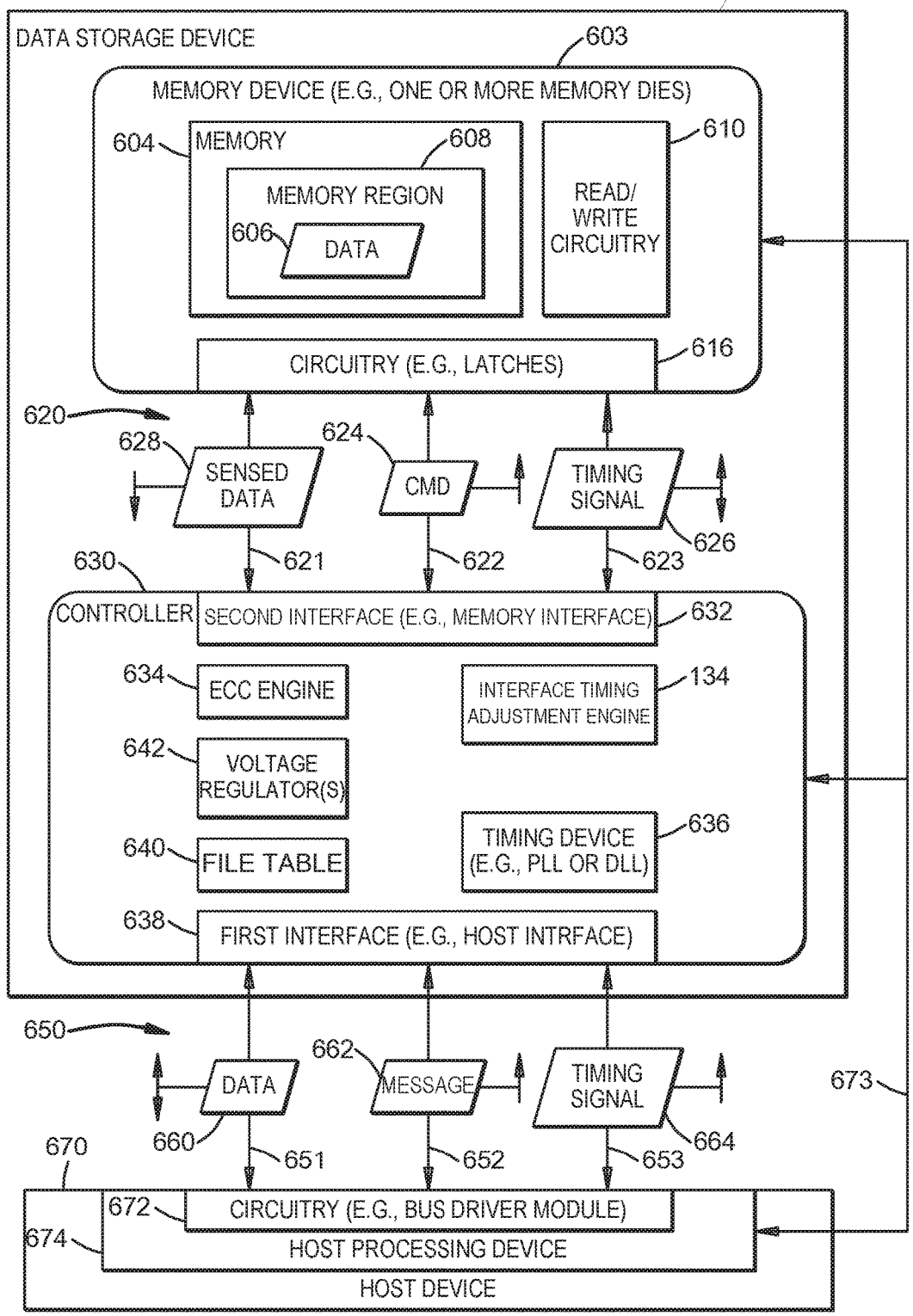
FIG. 6 is a block diagram of a particular illustrative example of a data storage system including a data storage device that includes an interface timing adjustment engine.

FIG. 6 depicts an illustrative example of a data storage system 600. The data storage system 600 includes a data storage device 602 (e.g., the data storage system 100) and a host device 670 (e.g., the host 302).

The data storage device 602 may include a memory device, such as a memory device 603. The memory device 603 may include one or more memory dies (e.g., one memory die, two memory dies, eight memory dies, or another number of memory dies). To further illustrate, the memory device 603 may include the non-volatile memory die 104. The memory device 603 includes a memory 604, such as a non-volatile memory of storage elements included in a memory die of the memory device 603. For example, the memory 604 may include a flash memory, such as a NAND flash memory, or a resistive memory, such as a resistive random access memory (ReRAM), as illustrative examples. The memory 604 may have a three-dimensional (3D) memory configuration. As an example, the memory 604 may have a 3D vertical bit line (VBL) configuration. In a particular implementation, the memory 604 is a non-volatile memory having a 3D memory configuration that is monolithically formed in one or more physical levels of arrays of memory cells having an active area disposed above a silicon substrate. Alternatively, the memory 604 may have another configuration, such as a two-dimensional (2D) memory configuration or a non-monolithic 3D memory configuration (e.g., a stacked die 3D memory configuration).

The memory 604 may include one or more regions of storage elements (also referred to herein as memory cells), such as a memory region 608. An example of a memory region is a block, such as a NAND flash erase group of memory elements. Another example of a memory region 608 is a word line of memory elements. A word line may function as a single-level-cell (SLC) word line or as a multi-level-cell (MLC) word line (such as a three-bit-per-cell word line or a two-bit-per-cell word line, as illustrative examples). Each memory element of the memory 604 may be programmable to a state (e.g., a threshold voltage in a flash configuration or a resistive state in a resistive memory configuration) that indicates one or more bit values.

The memory device 603 further includes read/write circuitry 610. The read/write circuitry 610 is configured to program values to storage elements of the memory 604 and to sense values from memory elements of the memory 604. The memory device 603 may further include circuitry 616 (e.g., one or more data latches, one or more control latches, or a combination thereof).

The data storage device 602 may further include a controller 630. The controller 630 may include a first interface 638 (e.g., a host interface), an error correction code (ECC) engine 634, a timing device 636, a second interface 632 (e.g., a memory interface), and one or more voltage regulators 642. For example, the ECC engine 634 may correspond to the ECC engine 424, the first interface 638 may correspond to the host interface 420, and the second interface 632 may correspond to the memory interface 430. To further illustrate, the first interface 638 may include one or more latches to receive data and commands from the host device 670, and the second interface 632 may include one or more bus drivers to send data and commands to the circuitry 616 of the memory device 603. The controller 630 may store (or access) a file table 640, such as a file allocation table (FAT). The controller 630 also includes the interface timing adjustment engine 134.

The host device 670 may include circuitry 672. For example, the circuitry 672 may include one or more bus drivers. The circuitry 672 may be integrated within or coupled to a processor or controller of the host device 670, such as within a host processing device 674 (e.g., an application processor).

The data storage device 602 and the host processing device 674 are coupled via a connection 650 (e.g., a bus). For example, FIG. 6 illustrates that the connection 650 may include one or more data lines 651, one or more control lines 652, and one or more timing signal lines 653. The connection 650 is coupled to the first interface 638 and to the circuitry 672. In some implementations, the connection 650 may include or may be coupled to the physical layer interface 422 of FIG. 4.

The memory device 603 and the controller 630 are coupled via a connection 620 (e.g., a bus). For example, FIG. 6 illustrates that the connection 620 may include one or more data lines 621, one or more control lines 622, and one or more timing signal lines 623. The connection 620 is coupled to the circuitry 616 and to the second interface 632.

In an illustrative implementation, the data storage system 600 further includes a power supply connection 673 (e.g., a "rail" to provide a power supply voltage, such as VDD, VCC, or both). The power supply connection 673 may be coupled to the memory device 603, the controller 630, and the host processing device 674. Depending on the particular implementation, the power supply connection 673 may be supplied by a battery (e.g., a mobile device battery) or by a power supply device (e.g., a transformer) coupled to a main power supply. In other implementations, the memory device 603, the controller 630, and/or the host processing device 674 are connected to separate power supply connections.

During operation, the controller 630 is configured to receive data and instructions from the host device 670 using the first interface 638. For example, the controller 630 may receive data 660 from the host device 670 via the first interface 638. To further illustrate, the data 660 may be received via the one or more data lines 651 in connection with a request for write access sent via the one or more control lines 652. The data 660 and the request may be received by the controller 630 based on a timing signal 664 (e.g., one or more clock signals, one or more strobe signals, or one or more read enable signals) received via the one or more timing signal lines 653. For example, the first interface 638 may include one or more latches to receive the data 360 based on the timing signal 664. Although FIG. 6 illustrates a single timing signal 664, it should be appreciated that more than one timing signal 664 may be used (e.g., a differential pair of timing signals).

The ECC engine 634 may be configured to receive the data 660 and to generate one or more ECC codewords based on the data 660. The ECC engine 634 may include a Hamming encoder, a Reed-Solomon (RS) encoder, a Bose-Chaudhuri-Hocquenghem (BCH) encoder, a low-density parity check (LDPC) encoder, a turbo encoder, an encoder configured to encode data according to one or more other ECC schemes, or a combination thereof.

The controller 630 is configured to send data and commands to the memory device 603 using the second interface 632 and to receive data from the memory device 603 using the second interface 632. For example, the controller 630 is configured to send data (e.g., one or more ECC codewords generated by the ECC engine 634) and a write command (e.g., a command 624) to cause the memory device 603 to store the data to a specified address of the memory 604. The write command may specify a physical address of a portion of the memory 604 that is to store the data. To further illustrate, the controller 630 may send the data to the memory device 603 via the one or more data lines 621 in connection with a write command sent via the one or more control lines 622. The memory device 603 may receive the data and the write command based on a timing signal 626 (e.g., one or more clock signals or one or more strobe signals) provided by the controller 630 via the one or more timing signal lines 623. For example, the circuitry 616 may include one or more latches configured to receive the data 660 based on the timing signal 664. The memory device 603 may cause the read/write circuitry to write the data to the memory 604 based on the timing signal 626. Although FIG. 6 illustrates a single timing signal 626, it should be appreciated that more than one timing signal 626 may be used (e.g., a differential pair of timing signals). Further, in some cases, the timing signal 626 may include a signal generated by the memory device 603, such as a read enable signal.

The controller 630 is configured to send a read command (e.g., the command 624) to the memory device 603 to access data from a specified address of the memory 604. For example, the controller 630 may send the read command to the memory device 603 in response to receiving a request for read access from the host device 670. The read command may specify the physical address of a portion of the memory 604. For example, the read command may specify the physical address of a portion of the memory 604 storing the data. In response to the read command, the memory device 603 may cause the read/write circuitry 610 to sense the portion of the memory 604 storing the data to generate sensed data (e.g., a representation of the data that may differ with respect to the data due to one or more bit errors).

The controller 630 is configured to receive the sensed data from the memory device 603 via the second interface 632. The controller 630 may input the sensed data to the ECC engine 634 to initiate a decoding process to correct one or more bit errors in the sensed data (if any) up to a particular error correction capability of the particular ECC technique. The ECC engine 634 may include a Hamming decoder, an RS decoder, a BCH decoder, an LDPC decoder, a turbo decoder, a decoder configured to decode data according to one or more other ECC schemes, or a combination thereof.

In response to decoding the sensed data, the ECC engine 634 may output the data 660. The controller 630 may provide the data 660 to the host device 670 using the first interface 638.

The host device 670 may periodically or occasionally initiate an adjustment process (e.g., a frequency calibration or "tuning" process) associated with the first interface 638. For example, the adjustment process may include adjusting the timing signal 664 (e.g., by adjusting frequency of the timing signal 664). During the adjustment process, the host device 670 may send (e.g., using the circuitry 672) data (e.g., the data 660) to the controller 630. The controller 630 may receive the data using the first interface 638, such as using one or more latches of the first interface 638. Alternatively or in addition, the adjustment process may include receiving data (e.g., the data 660) from the controller 630 by the host device 670.

In some implementations, the host device 670 initiates the adjustment process in response to a power-on event at the data storage system 600. Alternatively or in addition, the host device 670 may initiate the adjustment process in response to one or more other events, such as an error in connection with a request for read access or a request for write access (e.g., due to a temperature change or a voltage change at the data storage system 600) and/or during an idle time associated with the data storage device 602 (e.g., if the host device 670 is not requesting read access or write access).

Prior to the host device 670 initiating the adjustment process, the controller 630 may receive a message 662 specifying that the host device 670 is to perform the adjustment process. For example, FIG. 6 illustrates that the controller 630 may receive the message 662 via the one or more control lines 652. In other implementations, the controller 630 may receive the message 662 via another technique (e.g., via the one or more data lines 651, or via a dedicated bus or connection, as illustrative examples).

In some implementations, the message 662 complies with an interface protocol, such as an interface protocol in accordance with an industry standard. For example, the first interface 638 may comply with a MultiMedia Card (MMC) standard, such as an embedded MultiMedia Card (eMMC) standard. In this case, the message 662 may include a command that complies with an MMC or eMMC standard. As another example, the first interface 638 may comply with a Serial Advanced Technology Attachment (SATA) standard, and the message 662 may include a command that complies with the SATA standard. As an additional example, the first interface 638 may comply with a Universal Serial Bus (USB) standard, and the message 662 may include a command that complies with the USB standard.

The controller 630 is configured to initiate the adjustment process (e.g., an operating frequency calibration or "tuning" process) associated with the second interface 632 in response to the message 662. For example, the interface timing adjustment engine 134 may be configured to adjust the timing signal 626 (e.g., by adjusting a frequency of the timing signal 626). In an illustrative implementation, the interface timing adjustment engine 134 initiates the adjustment process in response to receiving the message 662 to enable the data storage device 602 to perform the adjustment process.

To further illustrate, certain examples of operations that may be performed during the adjustment process are described below. It should be appreciated that the examples are illustrative and that the scope of the disclosure is not limited to the described examples. To illustrate, one or more operations of one of the examples below may be combined with one or more operations of another of the examples without departing from the scope of the disclosure. Those of skill in the art will recognize that other modifications of the described examples are within the scope of the disclosure.

The adjustment process may include one or more of writing data to the memory 604 or reading data from the memory 604. To illustrate, in response to receiving the message 662, the interface timing adjustment engine 134 may cause the second interface 632 to send data 606 and a write command (e.g., the command 624) to the circuitry 616 using the connection 620. The write command may specify one or more physical addresses of the memory 604, such as a physical address of the memory region 608. Upon receiving the data 606 at the circuitry 616, the memory device 603 may cause the read/write circuitry 610 to program the data 606 to the memory 604. In response to programming the data 606 to the memory 604, the memory device 603 may send a status indication to the controller 630 indicating a status of the write operation (e.g., a pass or fail status).

In some implementations, the data 606 may include "dummy" data (e.g., a predetermined set of bits or a pseudo-randomly generated set of bits). In this case, the controller 630 may be configured to update the file table 640 to indicate that the data 606 is invalid (e.g., after receiving the status indication from the memory device 603 indicating a pass status of the write operation). In other cases, the data 606 may include user data. In this case, the controller 630 may be configured update the file table 640 to indicate that the data 606 is valid (e.g., after receiving the status indication from the memory device 603 indicating a pass status of the write operation).

Alternatively or in addition to writing data to the memory 604, the adjustment process may include reading data from the memory 604 and receiving the data at the controller 630 using the second interface 632. For example, the controller 630 may send a read command (e.g., the command 624) to the memory device 603 using the connection 620. The read command may specify the physical address of the memory region 608. The memory device 603 may cause the read/write circuitry 610 to sense the memory region 608 to generate sensed data 628. The memory device 603 may provide the sensed data 628 to the controller 630 using the connection 620, and the controller 630 may receive the sensed data 628 using the second interface 632.

Alternatively or in addition to writing data to the memory 604 and/or reading data from the memory 604, the adjustment process may include erasing data at the memory 604. For example, the controller 630 may send an erase command (e.g., the command 624) to the memory device 603 using the connection 620. The erase command may specify a physical address of a storage region. To illustrate, if erase command specifies the physical address of the memory region 608, the memory device 603 may cause the read/write circuitry 610 to erase the data 606 from the memory region 608. After erasing the data 606, the controller 630 may be configured to update the file table 640 to indicate that the memory region 608 is available for write operations. In some cases, the controller 630 is configured to rewrite the data 606 during the adjustment process (such as if the data 606 includes valid user data). In other cases, the controller 630 may not rewrite the data 606 during the adjustment process (e.g., if the data 606 is "dummy" data).

In some implementations, the controller 630 is configured to randomly or pseudo-randomly select the memory region 608. For example, the controller 630 may be configured to pseudo-randomly select one or more physical addresses storing valid data by accessing the file table 640. In this example, the controller 630 may be configured to pseudo-randomly select a physical address of the memory region 608 from the file table 640 in response to receiving the message 662 and to write or read data based on the selected physical address. Depending on the particular implementation, the controller 630 may select between physical addresses of the memory 604 storing valid data, physical addresses of the memory 604 storing invalid data, or both.

In another example, the memory region 608 may include a "dedicated" storage area that is reserved for operations performed during the second adjustment process. For example, the memory region 608 may include a memory area that has been closed to write operations (e.g., due to a malfunction, a defect, or a high number of program/erase cycles). In this case, the data 606 may include dummy data (instead of user data).

In some implementations, the ECC engine 634 may perform one or more ECC operations (e.g., encoding operations and/or decoding operations) during the second adjustment process. To illustrate, in some implementations, the ECC engine 634 may encode data to generate the data 606 during the second adjustment process. Alternatively or in addition, the ECC engine 634 may decode the sensed data 628 to generate decoded data during the second adjustment process. In an illustrative implementation, the ECC engine 634 performs ECC operations in response to the controller 630 sending or receiving data at the connection 620 during the adjustment process.

In some implementations, the controller 630 may send data to and receive data from one or more latches of the circuitry 616 without causing the memory device 603 to program the data to and sense the data from the memory 604. For example, the controller 630 may be configured to send the data 606 and a command (e.g., the command 624) to the circuitry 616 using the connection 620. In some implementations, the command 624 indicates that the memory device 603 is to "hold" the data 606 in one or more latches of the circuitry 616 (e.g., without programming the data 606 to the memory 604). The controller 630 may retrieve the data 606 from one or more latches of the circuitry 616 via the connection 620 during the adjustment process. Thus, in some implementations the adjustment process includes latch-based operations (e.g., does not include writing data to or reading data from the memory 604), and in some implementations the adjustment process includes memory-based operations (e.g., by writing data to and/or reading data from the memory 604 during the adjustment process).

Depending on the particular application, a latch-based adjustment process may generate more noise at the connection 620 as compared to a memory-based adjustment process. For example, if data is not written to and/or read from the memory 604 during the adjustment process, the connection 620 may remain charged during the second process (e.g., due to a capacitive effect associated with values stored in one or more latches of the circuitry 616). A latch-based adjustment process may be advantageous in applications where the connection 650 is sensitive to noise generated at the connection 620 (e.g., if the connection 650 is located near the connection 620). In some cases, a memory-based adjustment process may generate more noise at the power supply connection 673 as compared to a latch-based adjustment process. For example, use of programming voltages and/or read voltages during programming and/or read operations may generate noise at the power supply connection 673. A memory-based adjustment process may be advantageous in applications where one or both of the connections 620 are sensitive to power supply noise (e.g., if one or both of the connections 620 are sensitive to "glitches" in a supply voltage provided by the power supply connection 673, such as glitches that are due to capacitance and/or inductance that may be associated with the power supply connection 673).

Alternatively or in addition to latch-based operations and memory-based operations, the adjustment process may include ECC-based operations (e.g., by performing one or more encoding operations and/or one or more decoding operations at the ECC engine 634 during the adjustment process). In some applications, operation of the ECC engine 634 during the adjustment process may affect operation of the connection 650, such as by generating noise at the power supply connection 673 that affects the connection 650. In an illustrative implementation, the adjustment process may be performed in accordance with a "full power" mode during which data is encoded, sent to the circuitry 616, written to the memory 604, sensed from the memory 604, provided to the second interface 632, and decoded by the ECC engine 634. A "full power" mode may be advantageous if the adjustment process is to provide a "worst case" amount of noise and/or power consumption. For example, certain operations (such as the "full power" mode) may cause a "peak" power usage that temporarily reduces a level of a supply voltage provided by the power supply connection 673. In this case, performance of one or more interface drivers may be temporarily reduced, resulting in a "worst case" operating condition.

In some cases, the data storage device 602 may "extend" the adjustment process (e.g., by repeating the adjustment process one or more times or by performing one or more other operations). To illustrate, the host device 670 may indicate termination of the adjustment process either directly (e.g., using a particular command) or indirectly (e.g., by ceasing to use the connection 650 or by sending a read command or a write command to the data storage device 602). In some implementations, the data storage device 602 is configured to "extend" the adjustment process until the host device 670 indicates termination of the adjustment process.

In some cases, the adjustment process may include performing one or more operations specified by the host device 670. For example, the message 662 may indicate one or more types of operations to be performed during the adjustment process (e.g., one or more write operations, one or more read operations, one or more encoding operations, one or more decoding operations, one or more other operations, or a combination thereof), a number of operations to be performed during the adjustment process, a duration of the adjustment process, or a combination thereof. To further illustrate, in some cases the message 662 may include a field (e.g., a bit) indicating whether the data storage device 602 is to perform the adjustment process in accordance with the "full power" mode. For example, if the data storage system 600 is implemented as a battery-powered device (e.g., a mobile device or a laptop device, as illustrative examples), the field may indicate use of the "full power" mode based on an amount of battery charge satisfying a threshold and/or if the data storage system 600 is currently connected to a main power supply for charging of the battery. It is noted that the disclosure is not limited to these examples and that the system data storage system 600 may be implemented as another device (e.g., a server, a cloud storage device, or a desktop computer, as illustrative examples).

The adjustment process may further include adjusting a frequency of the timing signal 626. For example, the interface timing adjustment engine 134 may be configured to adjust the frequency of the timing signal 626 in connection with the adjustment process during one or more of the foregoing operations. In an illustrative implementation, the interface timing adjustment engine 134 is configured to perform a first operation on the memory 604 through the second interface 632 at a first frequency of the timing signal 626 associated with the second interface 632 to determine a first data pattern stored in circuitry 616 (e.g., in the data latches). The interface timing adjustment engine 134 performs a read operation on the memory 604 through the second interface 632 at a second frequency of the timing signal 626 to determine a second data pattern stored in circuitry 616 (e.g., in the data latches). In an embodiment, the adjustment process to adjust the frequency of the timing signal 626 may occur during an idle time of the second interface 632 or a predetermined amount of time after the completion of the controller 630 servicing an interrupt.

In an embodiment, the second frequency is a relaxed frequency that is lower than a maximum operating frequency. In an embodiment, the first operation is a write operation. In an embodiment, the first operation is a read operation.

In response to the interface timing adjustment engine 134 determining that the first pattern equal to the second pattern, the interface timing adjustment engine 134 increases the first frequency of the timing signal 626 by a predetermined amount. In response to the interface timing adjustment engine 134 determining that the first pattern is not equal to the second pattern, the interface timing adjustment engine 134 decreases the first frequency by the predetermined amount. The performing a first operation, the read operation, and increasing or decreasing the first frequency are repeated until the first frequency is equal to a maximum operating frequency having an associated risk of a setup/hold violation that is below a predetermined probability.

In an embodiment, the predetermined amount is based on a setup and hold time required by the read operation. The predetermined amount is based on at least one of a change in operating voltage, operating temperature, or load of the second interface 632. In an embodiment, the first pattern not being equal to the second pattern and the setup and hold time determines a maximum frequency of operation of the second interface 632.

In an illustrative implementation, the controller 630 includes an exclusive-or (XOR) device configured to perform a set of XOR operations using first sensed data of the first data pattern and the second data pattern and the copy of the data 606 of the first data pattern and the second data pattern to determine a number of errors in the first data pattern and the second data pattern.

In some implementations, the adjustment process may include adjusting a voltage level (e.g., "drive strength") of one or more signals. For example, during the adjustment process, the interface timing adjustment engine 134 may adjust a voltage level of a voltage used at the connection 620, such as by adjusting operation of the one or more voltage regulators 642 (e.g., by selectively activating or deactivating one or more voltage divider devices included in the one or more voltage regulators 642). Adjusting the drive strength may modify a rise time or a fall time associated with a signal. Further, although FIG. 6 illustrates that the one or more voltage regulators 642 are included in the controller 630, it should be appreciated that one or more voltage regulators may be included in the memory device 603 alternatively or in addition to the controller 630.

After performing the adjustment process, the data storage device 602 may continue operation (e.g., by responding to requests for read access or write access from the host device 670). For example, the controller 630 may send data to and receive data from the memory device 603 using the adjusted frequency of the timing signal 626 determined during the adjustment process. The controller 630 may subsequently initiate one or more additional adjustment processes, such as in response to an error at the second interface 632 or in response to receiving another message from the host device 670 specifying that another adjustment process is to be performed.

The examples described with reference to FIG. 6 may enable the adjustment process performed by the host device 670 to compensate for effects on the connection 650 that are due to operations at the connection 620 (and vice versa), resulting in more accurate frequency adjustment of the timing signal 664 (and more accurate frequency adjustment of the timing signal 626). Operation of the data storage system 600 is therefore improved as compared to a conventional device that uses separate (or "non-overlapping") adjustment processes (e.g., due to fewer errors and/or due to less frequent adjustment processes at the data storage system 600 after the adjustment processes are completed).

As described with reference to FIG. 6, "on the fly" monitoring of the bus operations may provide a real-time warning of nearing a condition of a hold time violation. The real-time measure may enable operation of the second interface 632 (and a corresponding bus) at a "maximal" reliable clock frequency. In response to identification of a risk of a hold violation, the controller 630 may adjust a frequency of the clock signal Clk to avoid the hold time violation. By adjusting frequency, the second interface 632 can reliably operate with a "maximal" frequency during different operating conditions that result from changing PVT conditions. Accordingly, the second interface 632 may operate at rate that is higher than a worst-case scenario rate, thus improving an overall performance of the second interface 632.

A particular illustrative example of a method of adjusting a frequency of a clock signal based on write operations is described hereinbelow. The method may be performed by the interface timing adjustment engine 134 of the controller 630 of FIG. 6. An interface timing adjustment engine 134 sets a default write clock frequency of the timing signal 626 associated with the second interface 632. The interface timing adjustment engine 134 waits for a completion of an interrupt service routine of an interrupt according to an interrupt timer. If an interrupt timer has expired, and the interface timing adjustment engine 134 determines that the data storage system 600 has entered an idle mode, then the interface timing adjustment engine 134 writes a write data pattern stored in circuitry 616 (e.g., in the data latches). The interface timing adjustment engine 134 reads a read data pattern stored in circuitry 616 at a relaxed safe frequency that is below the default write clock frequency. The interface timing adjustment engine 134 compares the first data pattern to the second data pattern. If the write data pattern is equal to the read data pattern, then the interface timing adjustment engine 134 increases the clock frequency by a predetermined amount, otherwise, the interface timing adjustment engine 134 decreases the clock frequency by the predetermined amount. Processing returns in either case to writing a data pattern stored in circuitry 616 after entering idle mode.

A particular illustrative example of a method of adjusting a frequency of a clock signal based on read operations is described hereinbelow. The method 800 may be performed by the interface timing adjustment engine 134 of the controller 630 of FIG. 6. The interface timing adjustment engine 134 sets a default read clock frequency of the timing signal 626 associated with the second interface 632. At The interface timing adjustment engine 134 waits for a completion of an interrupt service routine of an interrupt according to an interrupt timer. If an interrupt timer has expired, and the control circuitry determines that the data storage system 600 has entered an idle mode, then the interface timing adjustment engine 134 reads a reads read data pattern at a relaxed safe frequency that is below the default read clock frequency. A The interface timing adjustment engine 134 reads a second read data pattern stored in circuitry 616 at the clock frequency. The interface timing adjustment engine 134 compares the first read data pattern to the second read data pattern. If the first read data pattern is equal to the second read data pattern, then the interface timing adjustment engine 134 increases the clock frequency by a predetermined amount, otherwise, the interface timing adjustment engine 134 decreases the clock frequency by the predetermined amount. Processing returns in either case to writing a data pattern stored in circuitry 616 after entering idle mode.

Figure 7:
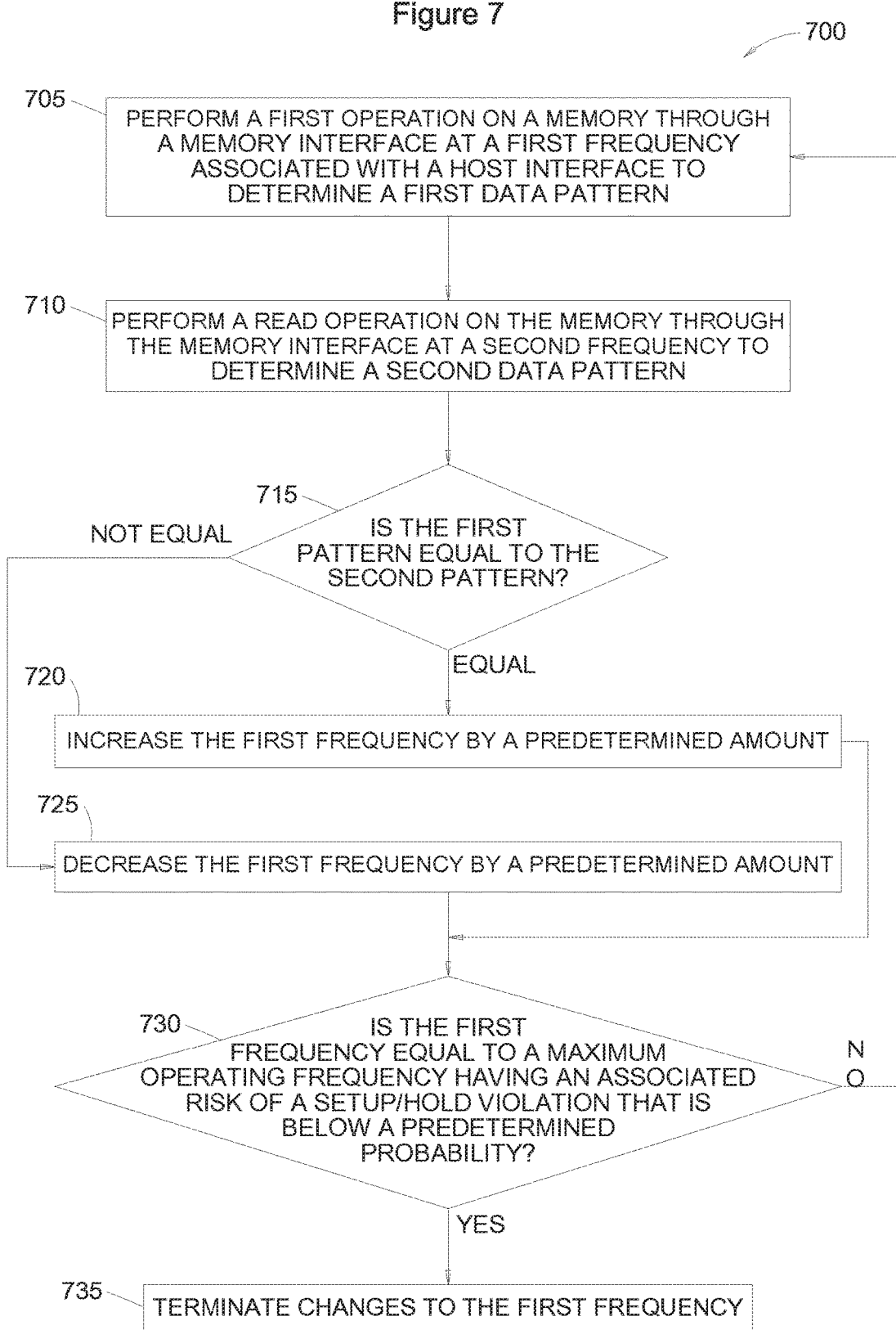
FIG. 7 is a flowchart of an illustrative example of a method of adjusting a frequency parameter of an interface bus.

Referring to FIG. 7, a particular illustrative example of a method of adjusting a frequency parameter associated with a bus speed is depicted and generally designated 700. The method 700 may be performed by the interface timing adjustment engine 134 of the controller 630 of FIG. 6. In an illustrative implementation, at block 705, the interface timing adjustment engine 134 performs a first operation on the memory 604 through the second interface 632 at a first frequency of the timing signal 626 associated with the second interface 632 to determine a first data pattern stored in circuitry 616 (e.g., in the data latches). At block 710, the interface timing adjustment engine 134 performs a read operation on the memory 604 through the second interface 632 at a second frequency of the timing signal 626 to determine a second data pattern stored in circuitry 616 (e.g., in the data latches). In an embodiment, the adjustment process to adjust the frequency of the timing signal 626 may occur during an idle time of the second interface 632 or a predetermined amount of time after the completion of the controller 630 servicing an interrupt.

In an embodiment, the second frequency is a relaxed frequency that is lower than a maximum operating frequency. In an embodiment, the first operation is a write operation. In an embodiment, the first operation is a read operation.

If, at block 715, the interface timing adjustment engine 134 determining that the first pattern is equal to the second pattern, then at block 720, the interface timing adjustment engine 134 increases the first frequency of the timing signal 626 by a predetermined amount. If, at block 715, the interface timing adjustment engine 134 determining that the first pattern is not equal to the second pattern, then at block 725, the interface timing adjustment engine 134 decreases the first frequency by the predetermined amount. If, at block 730, the interface timing adjustment engine 134 determines that the first frequency is equal to a maximum operating frequency having an associated risk of a setup/hold violation associated with the second interface 632 that is below a predetermined probability, then at block 735, changes to the first frequency are terminated; otherwise, the method proceeds back to block 905.

In an embodiment, the predetermined amount is based on a setup and hold time required by the read operation. The predetermined amount is based on at least one of a change in operating voltage, operating temperature, or load of the second interface 632. In an embodiment, the first pattern not being equal to the second pattern and the setup and hold time determines a maximum frequency of operation of the second interface 632.

By adjusting an operating parameter based on the first output and the second output, "on the fly" (e.g., real-time) adjustments may be made to avoid setup/hold violations during operation of an interface. Additionally, by adjusting one or more parameters, such as the frequency of the clock signal Clk, an interface can reliably operate with a maximal frequency during different operating conditions that result from changing PVT conditions.

The above-disclosed subject matter is to be considered illustrative, and not restrictive, and the appended claims are intended to cover all such modifications, enhancements, and other implementations, that fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:
1. A method comprising:
in a data storage device that includes a controller and a memory, wherein the controller includes a host interface and a memory interface,
performing, by the controller, a first operation on the memory through the memory interface at a first frequency associated with the host interface to determine a first data pattern;
performing a read operation on the memory through the memory interface at a second frequency to determine a second data pattern; and
changing the first frequency by a predetermined amount until the first frequency is equal to a maximum operating frequency having an associated risk of a setup/hold violation that is below a predetermined probability, wherein changing the first frequency comprises:
in response to the first pattern being equal to the second pattern,
increasing the first frequency by the predetermined amount.

2. The method of claim 1, wherein the predetermined amount is based on a setup and hold time required by the read operation.

3. The method of claim 1, wherein the predetermined amount is based on at least one of a change in operating voltage, operating temperature, or load of the host interface.

4. The method of claim 1, further comprising terminating said changing when the first frequency is equal to the maximum operating frequency.

5. The method of claim 1, wherein said changing occurs during an idle time of the host interface.

6. The method of claim 1, wherein said changing occurs a predetermined amount of time after a completion of the controller servicing an interrupt.

7. The method of claim 1, wherein the second frequency is a relaxed frequency that is lower than the maximum operating frequency.

8. The method of claim 1, wherein the first operation is a write operation.

9. The method of claim 1, wherein the first operation is a read operation.

10. A method comprising:
in a data storage device that includes a controller and a memory, wherein the controller includes a host interface and a memory interface,
performing, by the controller, a first operation on the memory through the memory interface at a first frequency associated with the host interface to determine a first data pattern;
performing a read operation on the memory through the memory interface at a second frequency to determine a second data pattern; and
+changing the first frequency by a predetermined amount until the first frequency is equal to a maximum operating frequency having an associated risk of a setup/hold violation that is below a predetermined probability, wherein changing the first frequency comprises:
in response to the first pattern being not equal to the second pattern,
decreasing the first frequency by the predetermined amount.

11. A method comprising:
in a data storage device that includes a controller and a memory, wherein the controller includes a host interface and a memory interface,
performing, by the controller, a first operation on the memory through the memory interface at a first frequency associated with the host interface to determine a first data pattern;
performing a read operation on the memory through the memory interface at a second frequency to determine a second data pattern; and
changing the first frequency by a predetermined amount until the first frequency is equal to a maximum operating frequency having an associated risk of a setup/hold violation that is below a predetermined probability, wherein the predetermined amount is based on a setup and hold time required by the read operation, wherein the first pattern is not equal to the second pattern and the setup and hold time determine a maximum frequency of operation of the host interface.

12. A data storage device, comprising:
a controller and a memory, wherein the controller includes a host interface and a memory interface,
the controller configured to perform a first operation on the memory through the memory interface at a first frequency of a timing circuit associated with the host interface to determine a first data pattern,
the controller further configured to perform a read operation on the memory through the memory interface at a second frequency of the timing circuit to determine a second data pattern; and
an interface timing adjustment engine configured to change the first frequency by a predetermined amount until the first frequency is equal to a maximum operating frequency having an associated risk of a setup/hold violation that is below a predetermined probability, further comprising a plurality of latches coupled to a comparator and working in conjunction with the controller to determine whether the first pattern equals the second pattern.

13. The data storage device of claim 12, further comprising a timing device, wherein the controller is further configured to adjust a frequency of a timing signal associated with the host interface using the timing device to obtain the first frequency and the second frequency.

14. The data storage device of claim 13, wherein the controller is further configured to generate a clock signal or a strobe signal, and wherein the timing signal includes the clock signal or the strobe signal.

15. The data storage device of claim 13, further comprising a memory device, wherein the memory device is configured to generate a read enable signal, and wherein the timing signal includes the read enable signal.

16. A data storage device, comprising:
means for perform a first operation on a memory through a memory interface at a first frequency associated with a host interface to determine a first data pattern;
means for performing a read operation on the memory through the memory interface at a second frequency to determine a second data pattern;
means for changing the first frequency by a predetermined amount until the first frequency is equal to a maximum operating frequency having an associated risk of a setup/hold violation that is below a predetermined probability; and
means for determining, by a plurality of latches coupled to a comparator and working in conjunction with a controller, whether the first data pattern equals the second data pattern.

17. The data storage device of claim 16, further comprising a data bus coupled between the host interface and the memory interface, the data bus configured to communicatively couple a controller of the data storage device to a non-volatile memory of the data storage device.

18. The data storage device of claim 16, wherein the predetermined amount is based on a setup and hold time required by the read operation.

19. A method comprising:
in a data storage device that includes a controller and a memory, wherein the controller includes a host interface and a memory interface,
(a) writing, by the controller, a write data pattern to the memory through the memory interface at a first frequency associated with the host;
(b) reading a read data pattern from the memory through the memory interface at a lower frequency having an associated risk of a setup/hold violation that is below a predetermined probability;
(c) comparing the write data pattern to the read data pattern;
(d) either:

responsive to the write data pattern being equal to the read data pattern according to the comparison, increasing the first frequency by a predetermined amount; or responsive to the write data pattern not being equal to the read data pattern according to the comparison, decreasing the first frequency by a predetermined amount; and (e) repeating (a)-(c).

20. The method of claim 19, further comprising:
executing (a)-(c) responsive to the controller entering an idle mode.

21. The method of claim 19, further comprising:
waiting for an interrupt service routing to complete before executing (a)-(c).

22. A method comprising:
in a data storage device that includes a controller and a memory, wherein the controller includes a host interface and a memory interface, (a) reading, by the controller, a first read data pattern from the memory through the memory interface at a low frequency having an associated risk of a setup/hold violation that is below a predetermined probability;

(b) reading a second read data pattern from the memory through the memory interface at a second frequency higher than the low frequency associated with the host;

(c) comparing the first read data pattern to the second read data pattern;

(d) either:
responsive to the first read data pattern being equal to the second read data pattern according to the comparison, increasing the second frequency by a predetermined amount; or responsive to the first read data pattern not being equal to the second read data pattern according to the comparison, decreasing the second frequency by a predetermined amount; and (e) repeating (a)-(c).

23. The method of claim 22, further comprising:
executing (a)-(c) responsive to the controller entering an idle mode.

24. The method of claim 22, further comprising:
waiting for an interrupt service routing to complete before executing (a)-(c).

* * * * *